(12) United States Patent
Bingham et al.

(10) Patent No.: US 7,279,077 B2
(45) Date of Patent: Oct. 9, 2007

(54) METHOD OF FORMING A CHEMICAL COMPOSITION

(75) Inventors: Dennis N. Bingham, Idaho Falls, ID (US); Bruce M. Wilding, Idaho Falls, ID (US); Kerry M. Klingler, Idaho Falls, ID (US); William T. Zollinger, Idaho Falls, ID (US); Kraig M. Wendt, Idaho Falls, ID (US)

(73) Assignee: Bettele Energy Alliance, LLC, Idaho Falls, ID (US)

( * ) Notice: Subject to any disclaimer, the term of this patent is extended or adjusted under 35 U.S.C. 154(b) by 760 days.

(21) Appl. No.: 10/685,370

(22) Filed: Oct. 13, 2003

(65) Prior Publication Data

US 2005/0077170 A1    Apr. 14, 2005

(51) Int. Cl.
*B01J 19/00* (2006.01)
*C01B 25/00* (2006.01)
*C25B 1/00* (2006.01)

(52) U.S. Cl. .................. 204/157.44; 204/157.45; 205/340; 205/358

(58) Field of Classification Search .......... 204/157.44, 204/157.45; 205/340, 358
See application file for complete search history.

(56) References Cited

U.S. PATENT DOCUMENTS

| | | | |
|---|---|---|---|
| 4,492,741 A | 1/1985 | Struthers | 429/34 |
| 4,628,010 A | 12/1986 | Iwanciow | 429/19 |
| 4,904,357 A | 2/1990 | Sharifian et al. | 204/73 |
| 4,931,154 A * | 6/1990 | Hale et al. | 205/420 |
| 5,372,617 A | 12/1994 | Kerrebrock et al. | 48/61 |
| 5,514,353 A | 5/1996 | Adlhart | 422/239 |
| 5,599,640 A | 2/1997 | Lee et al. | 429/46 |
| 5,804,329 A | 9/1998 | Amendola | 429/34 |
| 5,997,821 A | 12/1999 | Joshi | 422/129 |
| 6,316,133 B1 | 11/2001 | Bossel | 429/17 |
| 6,433,129 B1 * | 8/2002 | Amendola et al. | 528/271 |
| 6,497,973 B1 | 12/2002 | Amendola | 429/19 |
| 6,534,033 B1 | 3/2003 | Amendola et al. | 423/648.1 |

OTHER PUBLICATIONS

Jeffers et al., "Disproportionation of Dimethoxyborane", Inorg. Chem. (no month, 1982), vol. 21, pp. 2516-2517.*

* cited by examiner

*Primary Examiner*—Edna Wong
(74) *Attorney, Agent, or Firm*—Wells St. John

(57) ABSTRACT

A method of forming a chemical composition such as a chemical hydride is described and which includes the steps of selecting a composition having chemical bonds and which is capable of forming a chemical hydride; providing a source of hydrogen; and exposing the selected composition to an amount of ionizing radiation to encourage the changing of the chemical bonds of the selected composition, and chemically reacting the selected composition with the source of hydrogen to facilitate the formation of a chemical hydride.

10 Claims, 1 Drawing Sheet

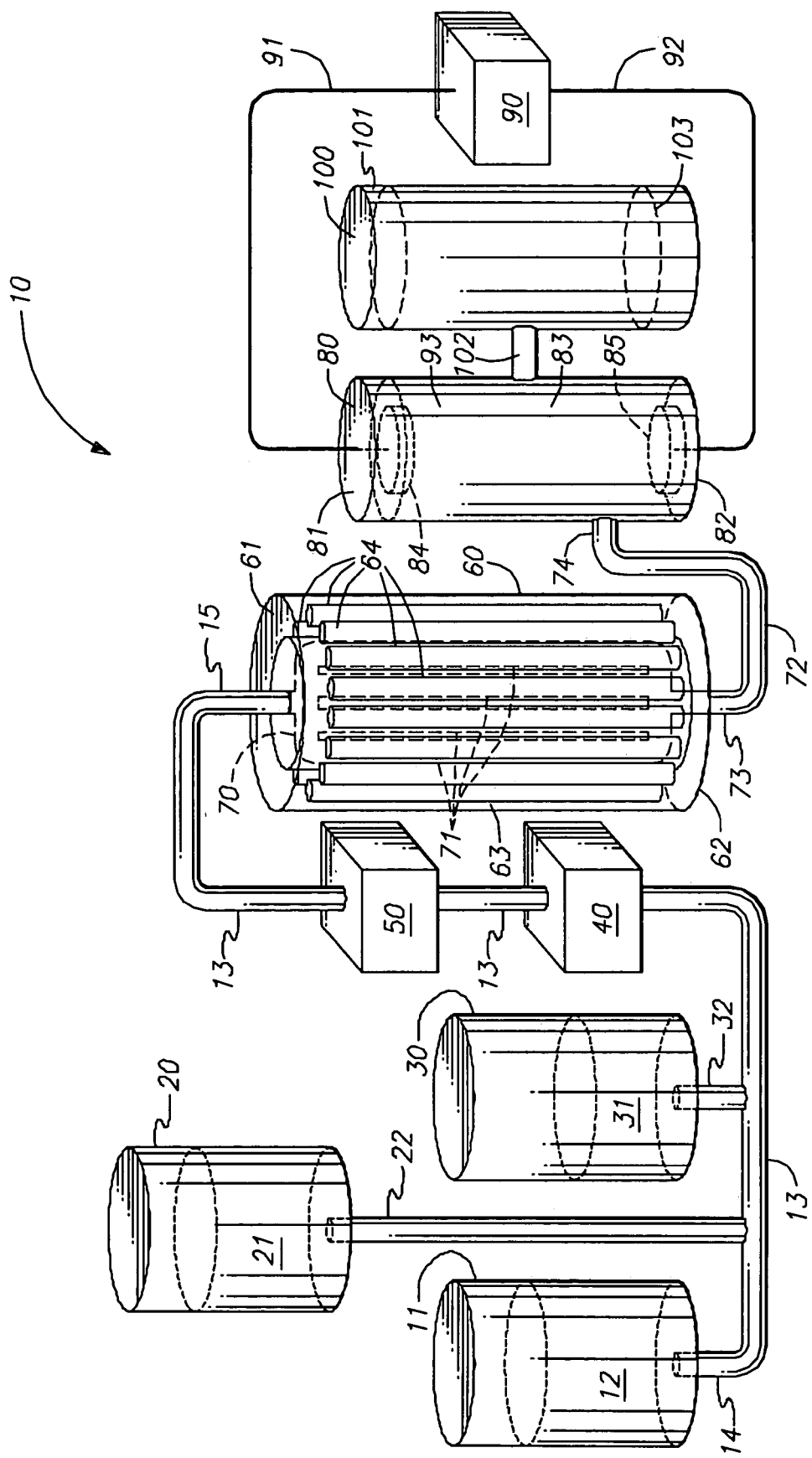

METHOD OF FORMING A CHEMICAL COMPOSITION

GOVERNMENT RIGHTS

The United States Government has certain rights in the following invention pursuant to Contract No. DE-AC07-99ID13727 between the U.S. Department of Energy and Bechtel BWXT Idaho, LLC.

TECHNICAL FIELD

The present invention relates to a method of forming a chemical composition, and more specifically to a method of forming a chemical hydride and which utilizes an amount of an ionizing radiation which facilitates the weakening, breaking or rearrangement of the chemical bonds of a selected composition to facilitate the formation of a chemical hydride.

BACKGROUND OF THE INVENTION

Various environmentally friendly technologies for powering assorted overland vehicles are currently under investigation. Legislative initiatives such as in the state of California which mandates the introduction of environmentally friendly vehicles powered by electricity are currently being addressed and manufacturers are seeking solutions to meet this mandate. Electric cars and hydrogen powered vehicles are currently under development by a number of different companies. Emerging as one of the most significant hurdles to the introduction of such technology is the problem of storing a fuel, such as hydrogen, which then may be either consumed by the vehicle in an internal combustion engine or utilized by a fuel cell which will provide electrical power to energize the motors utilized to power the vehicle.

Investigators and other researchers in this area of technology have long understood that hydrogen, as a fuel, is difficult to store and dispense. Still further, and in the case of fuel cell powered overland vehicles, it has been long recognized that fuel cells, powered by hydrogen, are not quick to adapt to changing load demands as might be experienced when a vehicle accelerates. Consequently, investigators have considered various hybrid electric powered vehicles which include various charge storage devices such as batteries. This solution has not been entirely satisfactory because, in the case of batteries, these devices have relatively low energy densities. Still further, in order to store a sufficient amount of hydrogen for use in a vehicle, whether the hydrogen is utilized by a fuel cell to produce electricity, or burned in an internal combustion engine, extremely high gas pressures must be employed. Recently, researchers have begun to investigate the use of various hydride chemistries to store increasing amounts of hydrogen for use with various overland vehicle platforms as well as fixed plant applications.

Hydride chemistry, as it is currently understood, appears promising as a potential storage medium for relatively large volumes of hydrogen. Hydrides store energy in a chemical form and also have the advantage of being recyclable in a subsequent chemical reaction by exposing the same to electrical power and a catalyst. One particularly promising hydride is sodium borohydride. When appropriately reacted, sodium borohydride releases hydrogen for use by a fuel cell, or an internal combustion motor. The borohydride is converted in this chemical reaction to borate. The expended borate can be converted back to sodium borohydride in a subsequent high temperature pressurized electrolysis process. However, the current chemical process to convert the borate back to sodium borohydride is costly, energy intensive and inefficient. Consequently, the existing process is not economically viable in view of the current costs of commercially available fossil fuels.

A method of forming a chemical composition which avoids the shortcomings attendant with the prior art practices and methods utilized heretofore is the subject matter of the present application.

SUMMARY OF THE INVENTION

One aspect of the present invention is to provide a method for forming a chemical composition such as a hydride, and which includes selecting a composition having chemical bonds and which is capable of forming a chemical hydride; providing a source of hydrogen; and exposing the selected composition to an amount of ionizing photonic radiation to weaken the chemical bonds of the selected composition, and chemically reacts the selected composition with the source of hydrogen to facilitate the formation of a chemical hydride.

Another aspect of the present invention is to provide a method of forming a borohydride, which includes providing a source of borate; mixing the source of borate with a liquid, such as water, to form a solution; exposing the solution of borate and water to an amount of ionizing radiation to facilitate the formation of borohydride; and precipitating or concentrating the borohydride from the solution of water and borate previously exposed to the ionizing radiation.

Yet still further another aspect of the present invention relates to a method of forming a borohydride, and which includes, providing a source of a recyclable borate which has chemical bonds, and which is safe to handle and store; providing a catalyst which is combined with a source of water; mixing the source of borate with the catalyst, and the source of water, to form a resulting solution; increasing the temperature and pressure of the resulting solution; exposing the resulting solution to an amount of ionizing radiation which weakens and/or breaks the chemical bonds of the borate to a degree which facilitates, in combination with the catalyst, the production of a borohydride; and precipitating or concentrating the borohydride so formed from the remaining solution.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 1 is a greatly simplified schematic representation of an arrangement for practicing the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A method of forming a chemical composition such as a chemical hydride of the present invention is best understood by a study of the arrangement in FIG. 1. As shown therein, one arrangement for practicing the present invention 10 includes providing a first container 11 which encloses a source of fluid 12 which may be homogeneous, or a mixture of other compositions. The fluid 12 provides a source of hydrogen which will be utilized in the present method. As described hereinafter, the source of the fluid 12 will be described as a source of water which is later combined with various other compositions in order to provide a resulting solution which is used in the present method 10. The source of the fluid or water 12 is coupled in fluid flowing relation relative to a fluid passageway or conduit 13 which has a first end 14 which is coupled in fluid flowing relation relative to the first container 11, and an opposite distal or second end 15 which is coupled with another assembly which will be discussed in greater detail hereinafter.

A second container which is generally indicated by the numeral 20 is provided and is operable to supply a source of a catalyst 21 which is combined or otherwise mixed with the source of the fluid (or water) 12. The source of the catalyst 21 which may be in a solid, or liquid form is coupled by way of a conduit or other passageway 22 with the conduit 13 such that the source of the catalyst 21 can be suspended, mixed, or otherwise combined with the source of the fluid 12 which is traveling therein. The chemical catalyst which is provided is selected to improve the reaction rates and efficiency of the method as will be described in greater detail below. Various nickel based catalysts may be utilized. Other catalysts that may be of particular value are those catalysts which are operable to weaken or otherwise break carbon-oxygen bonds or which assist in capturing and/or tying up oxygen which may be freed up during subsequent chemical reaction as will be described below. Catalysts that are particularly desirable include those which would facilitate the formation of a resulting chemical hydride as will be discussed in greater detail below.

Referring still to the drawing, a third container 30 is provided. The third container is operable to enclose or dispense a composition having chemical bonds which are capable of forming a chemical hydride. The passageway or conduit 32 couples the third container 30 in fluid flowing relation relative to the fluid passageway or conduit 13. This conduit or passageway 32 provides a pathway or course of travel by which the composition 31 may pass into the fluid stream traveling in the conduit 13 and thereby be mixed with same. The composition 31 may be in a solid (granular) or a liquid form, and other devices may be employed which are operable to meter the composition 31 from the enclosure 30 so that it is appropriately mixed and combined with water, or another source of the fluid 12 and/or the catalyst 21. As should be appreciated from a study of the drawings, the relative locations of where the fluid 12, catalyst 21, and composition 31 are provided to the passageway 13, or otherwise mixed together may vary based upon the nature of the composition that is being employed to form the resulting chemical hydride. Therefore, the drawing as shown is illustrative of only one arrangement by which the present method can be practiced. The selected composition 31 may comprise one or more elements selected from the periodic table of elements and which have an atomic number of greater than 2 and which forms a resulting chemical hydride having at least about 3 weight percent of hydrogen. It would also be advantageous, in a commercial environment, to select a composition 31 which can be safely handled, stored, and transported for use in remote locations. The method of forming a chemical composition such as a chemical hydride includes providing a composition 31 such as borate, mixing the source of borate with a fluid 12, such as water, (a source of hydrogen) to form a solution; and thereafter exposing the solution of borate and the fluid to an amount of ionizing radiation which may be derived from numerous sources including nuclear sources to facilitate the formation of a resulting borohydride; and precipitating or concentrating the borohydride from the solution of water and borate previously exposed to the ionizing radiation. The step of exposing the solution of the borate and the fluid and precipitating or concentrating the borohydride from the solution of the fluid and borate will be discussed in the paragraphs below.

Positioned therealong the fluid passageway or conduit 13, and downstream relative to the first container 11, second container 20 and third container 30 is a heater assembly which is generally indicated by the numeral 40. The heater assembly is operable to impart heat energy to the solution formed from the source of fluid 12, catalyst 21, and composition 31. As should be understood, higher temperatures increase the reaction rate of the solution. As a general matter, these temperatures will normally be kept at or above 0 degrees C. in those situations where the resulting chemical hydride to be prepared comprises a borohydride. The solution formed from the source of fluid 12, catalyst 21, and composition 31 then travels from the heater 40 to a charging pump which is generally indicated by the numeral 50. The charging pump increases the fluid pressure of same. Increased fluid pressures may be required to keep the resulting mixture formed of the source of fluid 12, catalyst 21, and composition 31 liquid, if the resulting temperatures imparted to same, and which are required for the resulting chemical reaction to proceed quickly, are above the boiling point of the solution or mixture that has been formed. As will be appreciated, in some situations, a charging pump 50 may be completely eliminated from the arrangement of practicing the methodology shown at numeral 10. Once the mixture of the fluid as described is pumped up to a given pressure, it proceeds along the fluid passageway 13 to the distal end 15 thereof.

A fourth container 60 is provided and which has a first end 61 and an opposite second end 62. The fourth container defines a cavity 63 which is operable to safely contain a plurality of spent or radiating nuclear rods, or other products derived therefrom, which are generally indicated by the numeral 64. These rods or other derived products 64 are operable to provide ionizing radiation which may include electromagnetic, photonic, and combinations of the foregoing, and which are operable to provide a means for radiolysis of the chemical bonds of the solution containing the composition 31 and which is capable of forming a hydride. The cavity 63 may further be filled with other materials which otherwise support or enclose the plurality of rods or other derived products 64. A fluid manifold 70 is disposed inside the cavity 60 and is coupled in fluid flowing relation relative to the second end 15 of the fluid passageway 13. The manifold 70 is further coupled to a plurality of conduits 71 which are directed along the length of the fourth container 60, and in adjacent relation relative to the plurality of spent nuclear rods 64. The plurality of conduits 71 exit thereafter through the second end 62 of the fourth container and are coupled in fluid flowing relation to a fluid passageway or conduit 72 which has a first end 73 and an opposite second end 74.

Referring still to the drawing, a fifth container 80 is provided. The fifth container has a first end 81, and an opposite second end 82. The fifth container defines an internal cavity 83 which is operable to receive the solution or mixture formed of the source of fluid 12, catalyst 21, and the composition 31 which is capable of forming a chemical hydride and which has previously passed through the cavity 63 which is defined by the fourth container. As earlier discussed, the method 10 of the present invention includes exposing the selected composition 31 to an amount of ionizing radiation to weaken, break, and/or facilitate the rearrangement of the chemical bonds of the selected composition 31 and chemically react the selected composition, with a source of hydrogen, and which is provided by the source of fluid 12, to facilitate the formation of a resulting chemical hydride. In the methodology 10 as disclosed in the present application, the method of the present invention further includes, after the step of providing a source of hydrogen, such as would be supplied through the source of fluid 12, and before exposing the selected composition 31 to an amount of ionizing radiation, providing a catalyst 21 which encourages the selected composition 31 to form the chemical hydride. On those occasions where the selected composition 31 includes the element of oxygen, the methodology further includes a step of exposing the selected composition to an amount of ionizing radiation which weakens the chemical bonds of the oxygen and facilitates the release of the oxygen from the selected composition 31.

The fluid passageway or conduit 72 couples the fifth container 80 with the fourth container 60. Once received in the cavity 83 of the fifth container 80, the resulting solution or mixture formed of the fluid 12, catalyst 21, and composition 31 is exposed to an electrical field which is imparted to the solution by way of an anode 84, and a cathode 85. The anode and the cathode are disposed in a substantially fixed location and in a submerged orientation relative to the fluid or mixture that is contained therein. A source of electrical power 90 is coupled by way of a pair of electrical conduits 91 to the respective anode and cathode. The electrical power provided to the anode and cathode results in an electrical field being created through the mixture. For example, in that situation where the resulting solution received within the cavity 83 is formed of a source of fluid 12, such as water, a source of catalyst 21, and a composition which contains borate to form a resulting borate solution 93, the resulting electrical field can be applied to the borate solution 93 to force ions to move apart within the solution. Still further, appropriate materials may be selected to coat the anode and cathode 84 and 85 and which encourages, on the one hand, oxygen gas formation at the cathode, and which further retards the production of hydrogen gas at the anode. Metals like gold or iridium oxide tend to promote oxygen formation, and other soft metals, and tellurides tend to retard or otherwise prevent the formation of hydrogen gas. In the present arrangement, a chemistry which encourages the removal of oxygen will tend to bias the resulting chemical reaction toward the formation of an appropriate chemical hydride.

A sixth container 100 is provided and which defines an internal cavity 101. The internal cavity 101 is coupled in fluid flowing relation relative to the cavity 83 defined by the fifth container 80. The borate solution 93 which has been exposed to the electrical field supplied by the anode and cathode 84 and 85, then passes by way of the fluid passageway 102 into the cavity 101. Once received within the cavity, the previous borate solution 93 which has now chemically reacted in an appropriate fashion in order to provide the resulting chemical hydride 103 is received therein and the chemical hydride 103 is precipitated and/or concentrated from the resulting solution and thereafter collected for use from the cavity 101. The precipitation may be accomplished by various means well known in the art.

OPERATION

The operation of the described methodology of the present invention is believed to be readily apparent and is briefly summarized at this point.

Referring again to the drawing, an arrangement for practicing a method of forming a chemical hydride is shown, and which includes the steps of selecting a composition 31 having chemical bonds and which is capable of forming a chemical hydride; providing a source of hydrogen, which may be provided by way of a source of fluid 12; and exposing the selected composition 31 to an amount of ionizing radiation which facilitates the changing of the chemical bonds of the selected composition 31, and chemically reacting the selected composition with the source of hydrogen to facilitate the formation of a resulting chemical hydride 103.

More specifically, the method 10 of the present invention may be useful in forming a borohydride, and which includes the steps of providing a source of borate 31, and mixing the source of borate 31, with a fluid 12, which may comprise water, to form a solution 83. The methodology further includes exposing the solution of borate and the fluid to an amount of ionizing radiation as provided by a plurality of rods or other products 64 derived therefrom to facilitate the formation of borohydride 103; and precipitating and/or concentrating the borohydride 103 from the solution of water and borate previously exposed to the ionizing radiation. In the methodology described, the method may further include providing a catalyst 21 which encourages the borate (which represents the source of the composition having the bonds which are capable of forming a hydride 31) to form the resulting borohydride 103. In the methodology, as described above, before the step of precipitating and/or otherwise recovering the borohydride 103 from the solution 93 which is formed of the fluid 21, and the composition 31 (which may include borate), and which was previously exposed to the ionizing nuclear radiation, the method further includes a step of applying a voltage to the solution of the borate and fluid 93. As discussed above, the borate 31 when combined with a fluid 21 which includes water, forms individual ions which move apart in the solution of the borate and fluid 93 when the voltage is applied to facilitate the formation of the resulting chemical hydride which may include a borohydride 103. In the methodology of the described invention 10, the ionizing radiation which facilitates the formation of a chemical hydride has a value of greater than about a microcurie per liter of the solution of the borate and the fluid 93. The methodology 10 may further include the steps of increasing the temperature of the solution and the composition 31 to greater than about 10 degrees C., and further increasing the pressure by way of the charging pump 50 on the source of fluid 12 and the composition 31 to maintain the resulting solution in a liquid phase.

Therefore, the methodology 10 of the present invention provides a convenient method of forming a chemical composition such as a borohydride and which includes providing a source of recyclable borate 31 which has chemical bonds and which is safe to handle and store; providing a catalyst 21 and which is combined with a source of water or other fluid 12; mixing the source borate 31 with the catalyst and source of water to form a resulting solution 93; increasing the temperature and pressure of the resulting solution by way of a heater assembly 40 and a charging pump 50; exposing the resulting solution to an amount of ionizing radiation which encourages the changing of the chemical bonds of the borate to a degree and which facilitates, in combination with the catalyst, the production of a borohydride; and precipitating and/or concentrating the borohydride 103 so formed from the remaining solution. The method 10 of the present invention further includes, after the step of precipitating the borohydride, reacting the recovered borohydride in a second chemical reaction which releases hydrogen which is recovered and used as a fuel. In the arrangement as shown, the borohydride 103 which is produced has at least about 3 weight percent of hydrogen.

Therefore it will be seen that the method of the present invention overcomes many of the shortcomings of the prior art devices and practices utilized heretofore. The method further provides a convenient means whereby a suitable chemical hydride may be economically produced and which can be utilized to produce a useful gas, such as hydrogen, which may be used in overland vehicles, fuel cells and other similar assemblies.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of forming a borohydride, comprising:
   providing a source of borate;
   mixing the source of borate with a fluid to form a substantially aqueous solution;
   exposing the solution of borate and the fluid to an amount of ionizing radiation to facilitate the formation of borohydride; and
   precipitating and/or concentrating the borohydride from the solution of the fluid and borate previously exposed to the ionizing radiation.

2. A method as claimed in claim 1, and wherein before the step of exposing the solution of borate and the fluid to the ionizing radiation, the method further comprises:
   providing a catalyst which encourages the borate to form the borohydride.

3. A method as claimed in claim 1, and wherein after the step of exposing the solution of borate and the fluid to the ionizing radiation, and before the step of precipitating and/or concentrating the borohydride from the solution of the fluid and borate previously exposed to the ionizing radiation, the method further comprises:
   applying a voltage to the solution of the borate and the fluid, and wherein the borate when combined with the fluid forms individual ions which move apart in the solution of borate and the fluid when the voltage is applied to facilitate the formation of the borohydride.

4. A method as claimed in claim 1, and wherein the amount of ionizing radiation which facilitates the formation of borohydride from the solution of borate and the fluid is greater than about a microcurie per liter of the solution of borate and the fluid.

5. A method as claimed in claim 1, and wherein after the step of mixing the source of borate with the fluid to form a substantially aqueous solution, and before the step of exposing the solution of borate and the fluid to an amount of ionizing radiation, the method further comprises:
   increasing the temperature of the solution of the borate and the fluid to greater than about 10 degrees C.; and
   increasing the pressure to greater than 1 ATM on the solution of borate and the fluid to maintain the solution in a liquid phase.

6. A method as claimed in claim 1, and wherein the resulting borohydride has at least about 3 weight percent of hydrogen.

7. A method as claimed in claim 1, and wherein the ionizing radiation is derived from a nuclear radiation source.

8. A method as claimed in claim 1, and wherein the borohydride is sodium borohydride, and wherein the borate is sodium borate.

9. A method as claimed in claim 2, and wherein the catalyst is a nickel-based catalyst.

10. A method of forming sodium borohydride, comprising:
    providing a source of sodium borate;
    mixing the source of sodium borate with a fluid to form a substantially aqueous solution;
    exposing the solution of sodium borate and the fluid to an amount of ionizing radiation derived from a nuclear radiation source to facilitate the formation of sodium borohydride; and
    precipitating and/or concentrating the sodium borohydride from the solution of the fluid and sodium borate previously exposed to the ionizing radiation.

* * * * *

UNITED STATES PATENT AND TRADEMARK OFFICE
CERTIFICATE OF CORRECTION

| | |
|---|---|
| PATENT NO. | : 7,279,077 B2 |
| APPLICATION NO. | : 10/685370 |
| DATED | : October 9, 2007 |
| INVENTOR(S) | : Bingham et al. |

It is certified that error appears in the above-identified patent and that said Letters Patent is hereby corrected as shown below:

Title Page
The named Assignee (73) is corrected to read Battelle Energy Alliance, LLC.

Signed and Sealed this

Twenty-seventh Day of November, 2007

JON W. DUDAS
*Director of the United States Patent and Trademark Office*